F. E. CASE.
POWER GENERATING SYSTEM.
APPLICATION FILED JUNE 18, 1917.
1,313,673.
Patented Aug. 19, 1919.
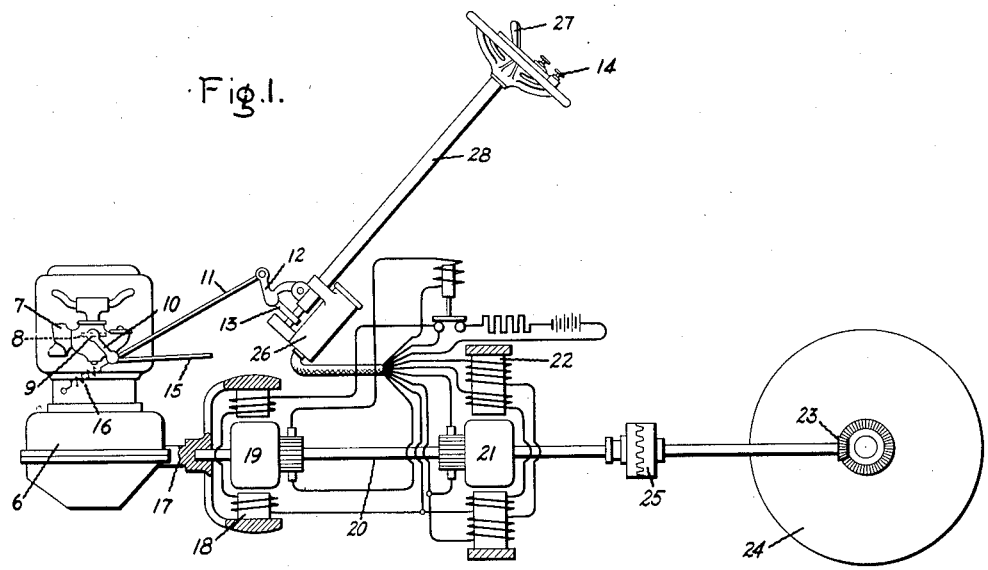
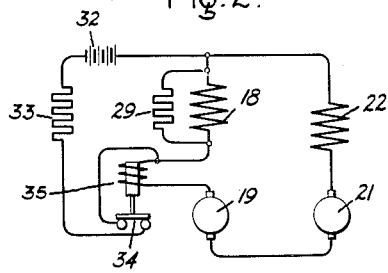
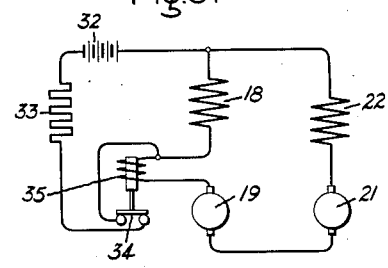
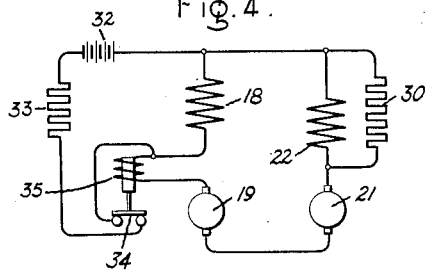
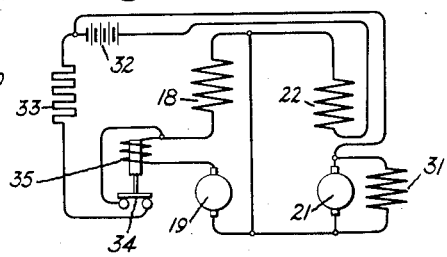
Inventor:
Frank E. Case,
by *[signature]*
His Attorney.

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

POWER-GENERATING SYSTEM.

1,313,673.      Specification of Letters Patent.      Patented Aug. 19, 1919.

Application filed June 18, 1917. Serial No. 175,319.

*To all whom it may concern:*

Be it known that I, FRANK E. CASE, a citizen of the United States, residing at Schenectady, county of Schenectady, State of New York, have invented certain new and useful Improvements in Power-Generating Systems, of which the following is a specification.

The present invention relates to power generating systems wherein a variable speed prime mover, usually an engine of the internal-combustion type, is employed to drive one member of a series wound electric generator, the other member being normally mechanically connected to a power absorbing means and having connected to it the rotor of an electric motor, the stationary member of which is carried by a suitable support, current generated by the first machine being supplied to the second for the purpose of increasing the torque delivered to the load or power absorbing means under certain conditions. One well recognized application of such a system is in connection with automobiles for the transmission of power from an internal combustion engine to the road wheels, and in the following specification the invention is specifically described as applied to this use, although it will be understood that it is not necessarily limited thereto.

In applying such a system to an automobile transmission, the field of the series generator is connected to the crank shaft of the internal combustion engine of the automobile, and the armature of the generator is connected to the transmission or propeller shaft. On this latter shaft is also the armature of the electric motor, the field of which is supported on the chassis. A suitable controller is provided for varying the electrical connections between the generator and the motor, the operating handle for the controller being located within reach of the driver.

For the greatest torque or pulling power the electrical connections are such that the field of the generator is relatively weak and there is the greatest difference between the engine speed and the transmission shaft speed. The magnetic clutching effect between the generator field and armature is light and at the same time a maximum current is being supplied from the generator to the motor. For the least torque or pulling power and the greatest speed, the controller is operated to change the circuit connection so that the generator is short circuited. The magnetic clutching effect between the generator field and armature is then the greatest and the difference in speed between the engine and the transmission shaft is least. No current is now supplied to the motor and it no longer assists in driving the load. Under these conditions it may be used as a generator to charge the storage battery. Intermediate between these two positions of greatest torque and least speed, and least torque and greatest speed, various circuit arrangements may be utilized to give various relations of torque and speed and various relations of engine speed to vehicle speed.

In connection with the operation of such a system, assume that the vehicle is at rest and the engine is running, the generator circuits, of course, being open, and that it is desired to start the vehicle. The engine is accelerated and the controller is moved to connect the generator to the motor. The generator then begins to build up, generating a current which is supplied to the motor, there being at the same time more or less tendency on the part of the generator field to drag the generator armature around with it. As the generator starts with no field and builds up its own, an appreciable time is required to do this and to get the vehicle under way.

Assume now that the controller is in any one of its various positions, and that the engine is running at a fairly high speed, the vehicle being in motion. If now, for any reason, the engine is throttled to decrease its speed, as, for example, to check the speed of the vehicle, or to permit of coasting, the rate of rotation of the generator field may closely approach, become equal to, or even less than the rate of rotation of the generator armature, and as a result of this, the current generated by the generator will become very small or even none at all, and as a consequence the field excitation of the generator will be greatly reduced or lost. Now upon accelerating the engine to increase the speed of the car, an appreciable time is required to again build up the series field of the generator and get under way. Furthermore, since the field is weak there is a tendency on the part of the engine to overspeed relative to the transmission shaft, that is to increase in speed faster than the magnetic clutching effect between the field and armature increases. In other words, the increase in vehicle speed does not keep pace with the increase in engine speed. As a consequence of this, a surge of current is generated with the result that there is sudden jerk of the vehicle which puts a decided jar on the transmission. A further effect of this is to decrease quickly the relative speed of the generator field and armature which, of course, will result in a decrease or even a reversal of the current being generated. The engine will then again pick up in speed with a repetition of the cycle just referred to, the action being similar to the "hunting" of an over-sensitive governor. As the cycle is quickly repeated, the result is successive surges of the current. Due to this a decided jerky action takes place upon quickly accelerating the vehicle.

The object of the present invention is to provide an improved arrangement in connection with this type of transmission system which will overcome the difficulties above referred to which are met with during the starting or accelerating of the vehicle. To this end I utilize in connection with the series field of the generator a means for providing separate auxiliary excitation therefor. The current used for this may be obtained from any available source, for example, from the storage battery on the car which is used for starting and lighting. The arrangement is also preferably such that the current for auxiliary excitation is supplied only while the series generator field is building and is automatically cut off as soon as the generator current reaches a predetermined value.

In the drawing, Figure 1 illustrates diagrammatically a part of an automobile vehicle equipped with my improved apparatus, and Figs. 2 to 5 are wiring diagrams.

Referring to the drawing, 6 indicates a multicylinder internal combustion engine of any suitable type which is capable of a wide range in running speed. On the side of the engine is a carbureter 7 containing the usual throttle valve 8 mounted on a spindle 9. 10 is an arm on spindle 9 which is connected by a rod 11 to a lever 12. The lever is actuated to change the position of the throttle valve 8 by a cam 13 of variable radius, which is rotated by a hand lever 14 on the steering column. The arm 10 is also connected by a rod 15 to a foot pedal (not shown) which is usually referred to as the accelerator. As is well understood, the arrangement of the two controlling means is such that the position of the hand lever 14 determines the position to which the throttle will be returned under the action of the spring 16 when the accelerator pedal is released.

On the main shaft 17 of the engine is mounted the field magnet 18 of a series wound direct current generator, the armature 19 of which is mounted on the transmission shaft 20 of the vehicle. Mounted on the transmission shaft 20 is also the armature 21 of a series wound motor, the field 22 of which is stationary and is suitably supported on the chassis of the vehicle. The transmission or propeller shaft 20 carries the usual pinion 23 which forms a part of the differential gearing through which the road wheels 24 are driven. The shaft 20 is preferably made in two sections united by a releasable jaw clutch, as shown at 25.

The circuits of the two electric machines are controlled by a controller 26 of any approved type mounted in such a manner as to be moved by the hand lever 27 on the steering column 28.

Referring now to Fig. 2 which illustrates the circuit connections for starting the vehicle, it will be observed that the motor is connected directly to the generator and that the generator field 18 is shunted by a limited amount of resistance 29, thereby weakening it to a certain degree. With this arrangement there is but a light magnetic clutching effect between the rotating field and armature of the generator and the maximum current is being supplied to the motor. This is the position of lowest speed and greatest torque. Fig. 3 represents the circuit connections for a higher speed condition, the shunt resistance 29 having been cut out. Fig. 4 represents the circuit connections for a still higher speed condition, the field of the motor being shunted by a resistance 30. Fig. 5 represents the circuit connection for the high speed position, the generator being short circuited on itself. The motor now acts as a substantially constant current generator, there being an additional shunt field 31 cut into circuit which acts in opposition to the series field winding, and may be used to charge the storage battery 32.

Referring now to the arrangement for providing an auxiliary excitation current to the generator field winding, it will be seen that in each of the running positions illustrated, the storage battery 32 or other source of current is connected through a suitable resistance 33 across the terminals of the generator field 18, the circuit connections including the contacts 34 of a magnetically operated automatic cut-out switch, the winding 35 of which is connected in series with the generator armature. The switch, which may be of any suitable structure, is biased toward closed position and is automatically opened when the current in winding 35 exceeds a predetermined value.

Assume that the engine is running and the vehicle is at rest, the controller 27 being in neutral position, and that it is desired to start the car. The controller 27 is moved to the first position establishing the circuit connection as shown in Fig. 2. The storage battery 32 is connected across the series field 18, since at this instant no current is being generated in the generator and the automatic cut-out switch is closed. The battery 32 thus supplies current to the series field 18 to give it initial excitation due to which the generator very quickly builds up. As soon as the current generated reaches a predetermined value, the magnetically operated switch is automatically opened thus opening the battery circuit and cutting off the auxiliary excitation current. If now for any reason the speed of the engine is brought down to a point where the current generated is below that required to keep the cut-out switch open, the same will automatically close, connecting the storage battery across the series generator field and again providing auxiliary excitation therefor, so that when the engine speed is again increased the generator will quickly build up.

The arrangement for providing separate initial excitation for the generator field may be utilized in connection with the circuit connection for only one of the positions of the controller, or for two or more, as found desirable. In the present instance, it is shown as being utilized in each instance and this is the arrangement I prefer.

By thus supplying an initial auxiliary excitation current to the series generator field the objectionable surging of the current or "hunting" referred to above is greatly reduced or substantially eliminated. Also upon accelerating the engine to get the vehicle again under way after it has been slowed down, the series generator field builds up sufficiently fast so that the increase in current closely follows the opening of the engine throttle, and the increase in vehicle speed follows the increase in engine speed.

The auxiliary exciting current also serves to fix the polarity of the generator so that the direction of the flow of current generated is always the same. In other words, with this arrangement there will be no reversal of polarity in the generator.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In combination, a generator comprising an armature member and a field magnet member having a series winding thereon, a variable speed means for revolving one of said members, and means controlled by the current generated by the generator for supplying an auxiliary excitation current to the series winding whenever the exciting current supplied by the generator to such field falls below a predetermined value.

2. The combination with a generator having a series field winding, of a source of electrical energy, a driving means for the generator, the speed of which varies over a wide range, and automatic means for connecting said source to the series field winding whenever the exciting current supplied by the generator to such field winding falls below a predetermined value, thereby providing separate auxiliary excitation for the generator.

3. In combination, a generator comprising an armature member and a field magnet member having a series winding thereon, said members being both mounted to revolve in the same direction, a driving means for one of said members, the speed of which may vary over a wide range, a source of current, and automatic means controlled by the current generated by the generator for connecting it to the series field winding to provide auxiliary excitation therefor whenever the field strength falls below a predetermined value.

4. In a power generating system, the combination of an electric generator having a series field winding, means providing initial excitation for said winding, and means controlled by the current generated by the generator for cutting off said initial excitation.

5. The combination with a generator having a series field winding, of a source of electrical energy, and means controlled by the current generated by the generator for connecting the source to the series field winding when the current generated by the generator falls below a predetermined value, and for disconnecting it therefrom when it rises above a predetermined value.

6. In an apparatus of the character described, the combination of a generator comprising an armature member and a field magnet member having a series winding thereon, said members being both mounted to revolve in the same direction, a variable speed means for revolving one of said members, and means controlled by the current generated due to the relative rotation of said two members for supplying an auxiliary excitation current to said field winding when such generated current falls below a predetermined value.

7. In an apparatus of the character described, the combination of a generator comprising an armature member and a field magnet member having a series winding thereon, said member being both mounted to revolve in the same direction, a variable speed means for revolving one of said members, a source of current, a circuit connecting it to the series winding, and an electromagnetic cut-out switch in said circuit having its winding connected in series with the armature and series winding of the generator.

8. In combination, a generator having a series field winding, a motor, a controller for varying the circuit connections between said generator and motor, a source of electric current which is connected by the controller across the terminals of the series field winding to provide initial excitation therefor in at least one of the positions of the controller, and means for automatically disconnecting said source from the series field when the current generated by the generator reaches a predetermined value.

9. In combination, a generator having a series field winding, a motor, a controller for varying the circuit connections between said generator and motor, a source of electric current which is connected by the controller across the terminals of the series field winding to provide initial excitation therefor in at least one of the positions of the controller, and means for automatically disconnecting said source from the series field when the current generated by the generator reaches a predetermined value and connecting it again thereto when the current generated falls below a predetermined value.

In witness whereof, I have hereunto set my hand this 14th day of June, 1917.

FRANK E. CASE.